May 19, 1959
P. FEDROWICH
2,887,080
SALVAGE DEVICE
Filed Sept. 26, 1957
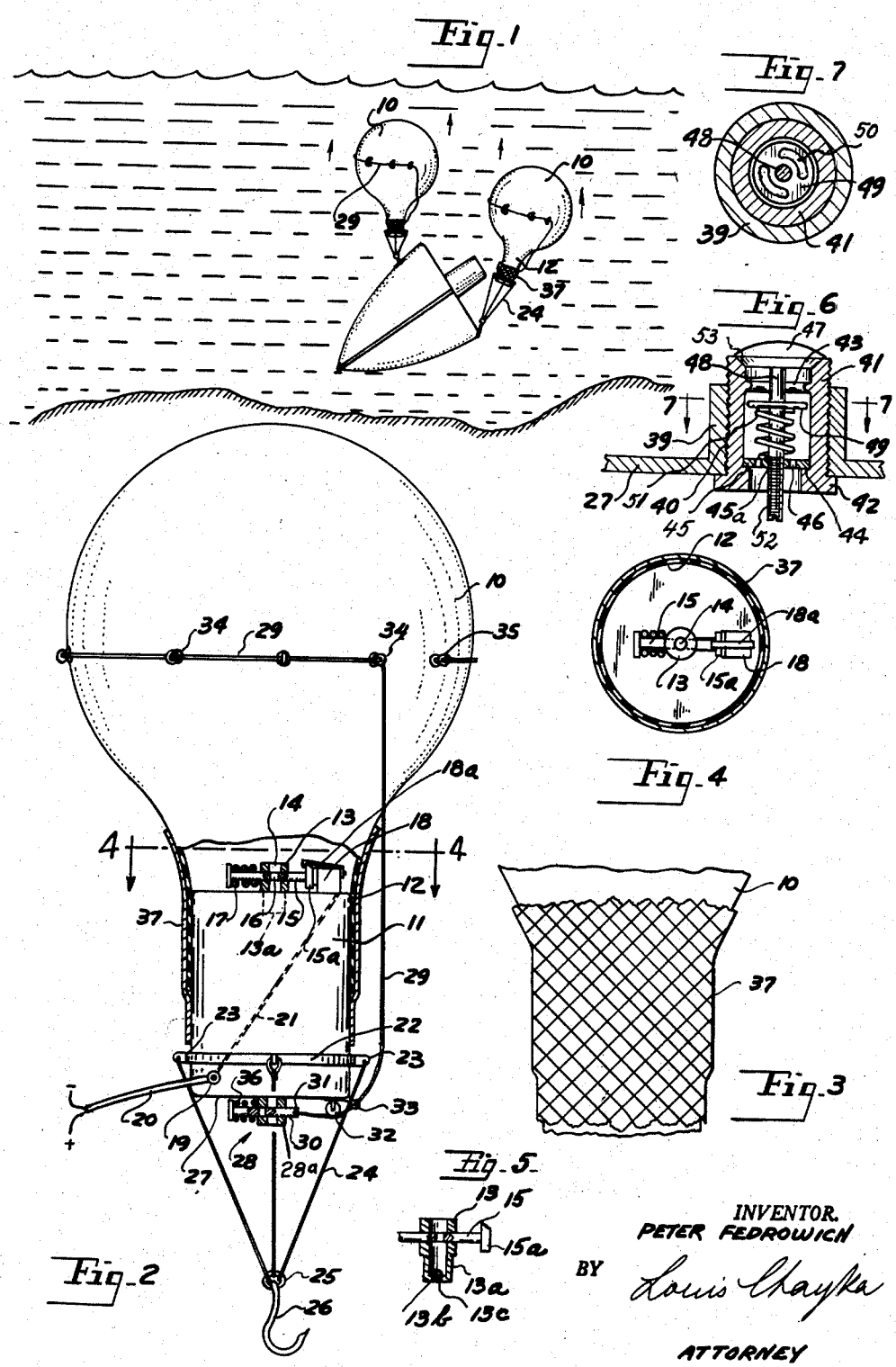
INVENTOR.
PETER FEDROWICH
BY Louis Chayka
ATTORNEY United States Patent Office 2,887,080
Patented May 19, 1959

2,887,080
SALVAGE DEVICE
Peter Fedrowich, Detroit, Mich.
Application September 26, 1957, Serial No. 686,315
6 Claims. (Cl. 114—54)

My invention pertains to means for raising sunken ships and other bulky objects which are fully immersed in water and which are located at such distances below the surface that any work of floating them is both difficult and expensive.

The means designed by me for the purpose include an inflated balloon in conjunction with a tank of compressed air which, in part, is used to inflate the balloon and which, in part, is released in the form of a jet to provide an initial thrust as an aid of the lifting power of the balloon.

These objects and other advantages of my invention will become apparent from the following description of my device. The description will include references to the accompanying drawings in which:

Fig. 1 is a diagrammatic presentation of a sunken ship and two of my salvage devices employed for the purpose of raising the ship to the surface;

Fig. 2 is a side elevational view, partly in section, of my device, the view including a balloon in its inflated condition, a tank suspended from the balloon, which tank contains compressed air, and other elements for the operation of the device;

Fig. 3 is a side view of a net-like sleeve employed as a self-contracting element of my device;

Fig. 4 is a sectional view on line 4—4 of Fig. 2;

Fig. 5 is a sectional view of a valve in the wall of the tank containing compressed air.

Fig. 6 is a vertical sectional view of a pressure-responsive valve;

Fig. 7 is a sectional view on line 7—7 of Fig. 6.

Similar numerals refer to similar parts throughout the several views.

The principal elements of my device are a balloon 10 and a tank 11 which contains compressed air. The balloon, being of a type which ordinarily is collapsed but which may be readily inflated, comprises a spherical body portion extending at what is its lower part into a constricted tubular throat 12 which is open downwardly. For a result which will be understood in the light of a further disclosure, it is desirable that the throat be made of elastic, flexible fabric in order that the throat may be expansible radially. Fitting into the throat 12, from below, is the above-named cylindrical tank 11, the lower portion of the tank extending below the lower end of the throat 12.

The tank is provided at the top with a valve which includes a short cylindrical member 13 having an axial bore 14 opening at the lower end into the interior of the tank. A sliding pin 15, disposed transversely in said member 13, normally blocks the bore 14, but is provided with a diametrical aperture 16. A coiled spring 17, wound about one end of the pin and bearing against the member 13 from outside, keeps the pin in a position where the aperture 16 is out of alinement with said bore 14. At the opposite end the pin terminates with a head 15a which is made of a metal susceptible to magnetic attraction, the head being normally in a spaced relation to a solenoid 18 mounted on top of said tank.

A tubular extension 13a of the cylindrical member 13 into the tank contains a free ball 13b designed to block an aperture 13c within said extension 13a, as shown in Fig. 5 the ball serving as a check valve permitting passage of air from the tank into the balloon, but blocking re-entry of the air back into the tank.

Mounted on top of the solenoid is a spring catch 18a which is adapted to engage said head 15a once the head has been drawn by the solenoid into contact therewith to prevent return movement of the pin under the action of the above-named coiled spring 17.

At its lower end the tank contains a receptacle member 19 adapted to receive a plug at the end of a cable leading from a source of electric current to wires 21 within the tank. The wires 21 are connected to the terminal points of said solenoid 18.

Encircling the lower end of the tank, and preferably welded thereto, is a hoop 22, and projecting therefrom are a plurality of eyes 23. Suspended from said eyes by means of cables 24 is a hook 26. The bottom wall 27 of the tank is provided with a nozzle, generally marked 28, which is equipped with a valve 28a of the same type as the valve shown on top of the tank, except that instead of being operated by a solenoid this one is adapted to be operated by the pull of a cable 29. The cable is attached at one end, as shown at 31, to a sliding pin 30 of said valve 28a, then passes under a pulley 32 mounted upon the tank, and through a guiding loop 33 upwardly to the balloon. There it passes in succession through a number of eyelets 34 mounted on the balloon in equally-spaced intervals about its periphery, without fully encircling said balloon. The end of the cable remote from said valve 28a, is anchored by being tied to an eyelet 35. As in the case of the first-named valve on top of the tank, the valve in the nozzle is normally closed by the action of a coiled spring 36.

As a means of keeping the tank within the throat 12 of the balloon, and as a means of binding the throat into an air-tight contact with the outer surface of the tank, I have employed a flexible basket-weave sleeve 37 made of cord, the sleeve fitting from outside about the throat 12 and the tank therein, but extending below the lower end of the throat and embracing also the tank.

The manner in which the device is to operate is as follows:

Assuming that it is a ship which has to be raised, it would be necessary to use a number of my devices. Each of them, with the balloon deflated and the valves of the tank closed, would be lowered to the ship, where a diver would secure the hook to a suitable member of the ship, such as a beam or a porthole.

Thereupon, a switch in the electric circuit including the solenoid is closed. This, for example, can be done by a person operating from a boat located above the sunken ship. Energized by the current, the solenoid, overcoming the action of spring 17, would cause the pin 15 in the valve on the top of the tank to slide towards the solenoid, thus opening said valve and permitting compressed air from the tank to enter the interior of the balloon, inflating it into its fully-spherical shape. Spring latch 18a, mounted on the solenoid, would engage the head 15a on the sliding pin 15, keeping the valve in its open condition.

The increase of the bulk of the balloon when inflated would cause the cable encircling the balloon to exert a pull upon the sliding pin 30 in the nozzle 28 at the lower end of the tank, opening said nozzle 28 and allowing the compressed air to rush outwardly in a jet, thus supplying to the tank a thrust upwardly, aiding the balloons in lifting the ship to the surface. The nozzle, if desired, may be provided with a suitable check valve to allow passage of air outwardly, but to prevent entry of water or air from outside into the tank.

A different device to serve as a nozzle for release of air or other gas from the tank downwardly in a jet is shown in Figs. 6 and 7. The device eliminates the need of the cable 29 which encircles the balloon, and takes the place of the nozzle 28 in the bottom wall 27 of the tank.

The device includes a cylindrical housing 41 which is threaded outwardly, as shown at 40, and fits into a bushing 39 in said bottom wall 27. At one end, which is its lower end, the housing includes an annular flange 42 which is in abutment from outside with said bottom of the tank. The housing is open at both ends and is provided, on its inner surface close to its upper end, with an annular bead 43. Within the lower end of the housing, resting on an inner shoulder 44, is a flat disk 45 having an axial hole 45a. The disk contains a number of holes 46.

The upper end of the housing is defined by a downwardly-slanting face 53 forming a seat for a valve 47 which is mounted on a vertical stem 48. The stem passes slidingly through said hole 45a and extends downwardly beyond the lower end of said housing. At a level below the bead 43 the stem carries a circular member 49 which is axially welded to said stem and which contains a number of holes 50. Coiled about the stem 48 is a spring 51 which at the lower end is seated upon said disk 45, while its upper end bears from below against said circular member 49, urging the stem, with the valve, upwardly. The lower end of the stem may be threaded, as shown at 52, for engagement with means which are not disclosed but are adapted to prevent the movement of the valve upwardly from its seat.

The manner in which the device operates is as follows:

Normally, when the tank contains air under atmospheric pressure, the spring 51, bearing against the cylindrical member 49 from below, would lift the valve from its tapered seat 53. The upward movement of the valve would be limited by the bead 43 on the inner surface of the housing against which the rim of the circular member 49 would be brought from below. However, should the tank be filled with air under sufficient pressure, said pressure would overcome the tension of the spring 51 and keep the valve upon said seat, thus closing the upper end of the housing.

Assuming now that a part of the volume of the air within the tank has been released into the balloon, as described herein, the pressure within the tank would be lowered to a level where the tension of the spring 51 would be sufficient to lift the valve and to permit the air from the tank to rush outwardly through the interior space within the housing 41 and through the holes 50 and holes 46 downwardly in a jet.

It will be understood that some elements of the device may be changed in structure and in operation, and that items such as the valves may be easily substituted by valves of other designs. This goes, also, to such details as securing an air-tight contact between the outer surface of the tank and the inner surface of the throat of the balloon. The fact is that even this relation between the tank and the throat is not essential. It would be possible, for instance, to have the balloon all enclosed but leaving only a tubular connection with the tank, and connecting the tank to the balloon in the manner in which gondolas for transportation of persons are conventionally suspended from balloons. It will be further understood that the tank may be filled with any suitable gaseous element, instead of being filled with air.

After having described my device, what I wish to claim is as follows:

1. A salvage device adapted to float sunken objects, the device including an inflatable balloon, a cylindrical tank suspended from the balloon, said balloon including a tubular throat opening downwardly and embracing the upper portion of the tank in an air-tight manner, a first valve in the upper end of the tank but within said throat, the valve being normally closed, means operated electrically and remotely to open said first valve for release of air from the tank into the balloon, a nozzle mounted within the wall of the tank in the lower portion thereof, the nozzle being directed downwardly, a second valve keeping the nozzle normally closed, a cable having one end anchored to the outer surface of the balloon and partly encircling the balloon along the line of its most expansible portion, the cable being supported by means permitting sliding longitudinal movement of the cable, the other end of the cable being connected to a member on said second valve responsive to the pull of the cable, on inflation of the balloon, to open the second valve in the nozzle to release air from the tank in a jet downwardly, and hook means suspended from the balloon by intermediate means for attachment to an object to be floated.

2. A salvage device adapted to float sunken objects, the device including an inflatable balloon having its lower portion formed into a tubular throat opening downwardly, a cylindrical tank filled with compressed air, the upper portion of the tank fitting into said throat, a basket-weave sleeve embracing the throat and the tank to keep the throat in an air-tight contact with the outer surface of the tank, a first valve in the upper end of the tank but within said throat, the valve being normally closed, means operated electrically and operated remotely to open said first valve to release a part of the volume of air from the tank into the balloon, a nozzle mounted within the bottom portion of the tank, the nozzle being directed downwardly, a second valve within the nozzle, the second valve being normally closed, and means responsive to the expansion of the balloon on inflation thereof to open the second valve in the nozzle to release the remaining volume of air within the tank outwardly in the form of a jet, and hook means suspended from the tank for attachment to an object to be floated.

3. A salvage device adapted to float objects sunk in a body of water, the device including an inflatable balloon, a tank with compressed air suspended from the balloon, a first valve in the wall of the tank, the valve being normally closed, tubular means to convey air through said first valve from the tank to the balloon, means operated electrically and operated remotely to open the first valve to release a part of the volume of the air into the balloon to inflate the same, a nozzle mounted in the bottom wall of the tank and extending downwardly therefrom, a second valve keeping the nozzle normally closed, and cable means responsive to the expansion of the balloon to open the last-named valve in the nozzle to release the remaining volume of air from the tank in a downwardly-directed jet, and means suspended from the balloon by intermediate means for attachment to the object to be floated.

4. A device as described in claim 3 in which said first valve in the upper wall of the tank includes means to allow passage of air from the tank into the balloon, but prevents re-entry of air from the balloon into the tank.

5. A salvage device adapted to float objects sunk in a body of water, the device including an inflatable balloon, a tank with compressed air suspended from the balloon, a first valve in the wall of the tank, the valve being normally closed, tubular means to convey air through said valve from the tank to the balloon, means operated electrically and operated remotely to open said first valve to release a part of the volume of the air into the balloon to inflate the same, means in said first valve to permit entry of air from the tank into the balloon, but preventing re-entry of the air from the balloon into the tank, a nozzle mounted in the bottom portion of the tank, the nozzle being directed downwardly and being provided with a valve known as a second valve, the valve being adapted to close said nozzle under the pressure of air within the tank, and spring means acting against said second valve and adapted to open said second valve on lowering of pressure of air within the tank for discharge of air from the tank in a jet, and cable means suspended from the balloon by intermediate means for attachment to the object to be floated.

6. A salvage device adapted to float objects sunk in a body of water, the device including an inflatable balloon, a tank with compressed air suspended from the balloon, a first valve in the wall of the tank, the valve being normally closed, tubular means to convey air through said first valve from the tank to the balloon, means operated electrically and operated remotely to open said first valve to release a part of the volume of the air into the balloon to inflate the same, means in said first valve to permit entry of air from the tank into the balloon, but preventing re-entry of the air from the balloon into the tank, a nozzle mounted in the bottom portion of the tank, the nozzle being directed downwardly, a second valve within the nozzle, the valve being normally closed by the pressure of air within the tank, spring means to open said second valve on lowering of pressure of air within the tank to release air therefrom through said nozzle in the form of a jet, and means suspended from the balloon for attachment to the object to be floated.

References Cited in the file of this patent

UNITED STATES PATENTS

| | | |
|---|---|---|
| 211,587 | Raydt | Jan. 21, 1879 |
| 2,213,375 | Barna | Sept. 3, 1940 |
| 2,313,215 | Bierlee | Mar. 9, 1943 |